Figure 1:
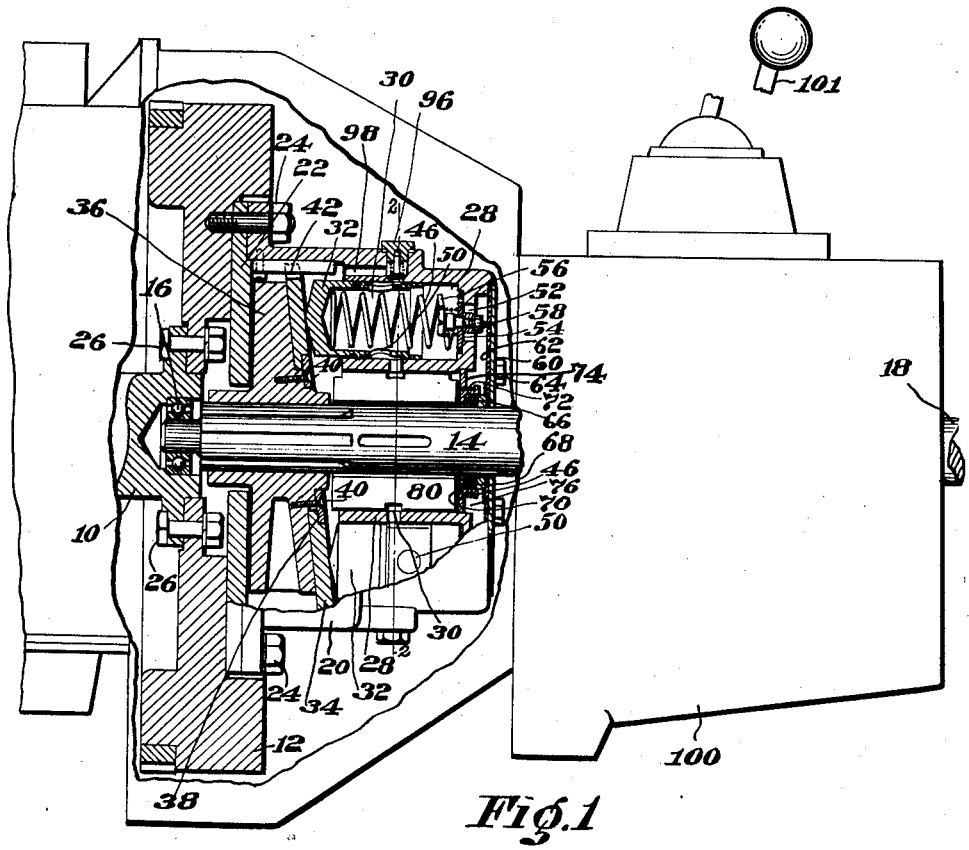

Aug. 22, 1933.　　　F. PULSIFER　　　1,923,582

POWER TRANSMITTING MECHANISM

Filed March 25, 1930

INVENTOR
Frank Pulsifer
BY
ATTORNEY

Patented Aug. 22, 1933

1,923,582

UNITED STATES PATENT OFFICE 1,923,582

POWER TRANSMITTING MECHANISM

Frank Pulsifer, Salem, Mass.

Application March 25, 1930. Serial No. 438,763

18 Claims. (Cl. 192—59)

This invention relates to improvements in power-transmitting mechanism between a driver and a driven member. A particular field of use for the invention is in connection with automobile transmission systems, utilizing selective change of speed gear sets.

Effective operation of present day motor vehicles requires carefully coordinated manipulation of the usual foot-operated friction clutch and engine power-controlling or accelerator devices. Operation of selective speed gear sets for enabling the vehicle to proceed under different conditions must also be timed with relation to that of the clutch and accelerator devices. Improper use or operation in conjunction with one another of the controls for these devices produces jerky acceleration of the vehicle and possible breakage of the mechanical parts. Hydraulic clutches and hydraulic change of speed apparatus have been developed with a view to simplifying their manipulation and obviating effects of improper operation. Numerous undesirable features in previous hydraulic clutches include leakage of fluid, complication in structure, difficulty in adjustment and expense of manufacture.

In accordance with one aspect of the present invention, a novel form of hydraulic clutch is contemplated, embodying features which adapt it for use automatically to couple or uncouple two sections of rotary shafting. The driving section may be associated with an internal combustion or other engine fly wheel, one part of the clutch being associated therewith and the other part with the driven member. The clutch embodies fluid pumping means including cylinders having throttling ports, and a centrifugally operated valve for controlling the ports. The construction is such that the closing of these ports takes place automatically and establishes a substantially direct drive between the driving and driven members as the members reach a predetermined rotary speed. The clutch is closed only at this predetermined speed and the driving and driven members are free for relative rotation at speeds therebelow. The operation of the clutch is entirely automatic and its closing is smooth and gradual, and it provides a substantially positive engagement of the members at speeds above the said predetermined speed. The normally open throttling ports permit approximately free relative rotation of the members, for idling, at relatively low speeds but cause substantial dragging torque therebetween as the speed of rotation approaches the clutch engaging limit, thus producing a comparatively easy and elastic acceleration of the driven member when the driving member is speeded up. The clutch is also constructed to permit a limited amount of over-running of the driven member, thus providing a smooth driving connection and eliminating the well-known jerky operation of vehicles caused by a clutch which engages in a substantially positive manner in both directions.

In another aspect, my invention includes within its scope the employment of my improved hydraulic clutch, as a substitute for the pedal-operated friction disk clutch ordinarily utilized with selective change of speed gears in present standard use on internal combustion engine-driven vehicles. This eliminates the clutch pedal and requires only manipulating the engine accelerator and gear shift controls. As an extra precaution, to prevent damage of parts from deliberate abuse, a safety release valve having a connection to each cylinder may be provided to permit operation of the pistons when excessive pressures are developed within the cylinders. This is to obviate stripping of the change of speed gears used therewith.

A hydraulic clutch constructed according to this invention is comparatively simple in construction, readily adjusted or repaired and the arrangement of cylinders and centrifugal valves permit short passages or throttling ports. This is advantageous since it provides small space for expansion of fluid, resulting in positive control under the action of the centrifugal valve. The ratchet-like operation of the clutch assists in easy selection of the change speed gears and allows the vehicle engine to pick up the load smoothly after selection is made. Ordinarily the clutch is capable of slipping sufficiently to start the vehicle in direct drive without injury or jerk, thus eliminating to a substantial degree the use of intermediate drive gears.

Figures 2, 3:
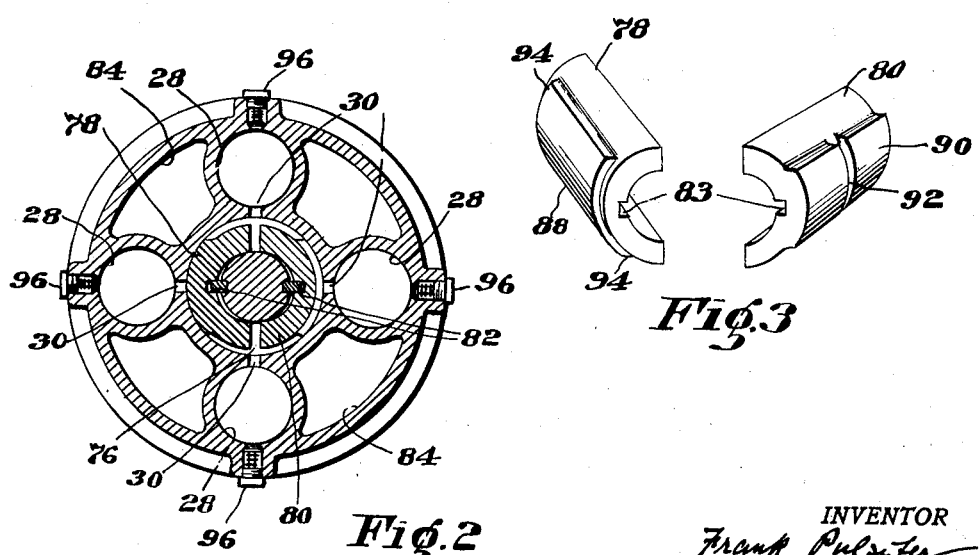

These and other features of the invention will be best understood and appreciated from the following description of a preferred embodiment thereof, selected for purposes of illustration and shown in the accompanying drawing, in which Fig. 1 is a view in elevation and partial section embodying a portion of an automobile transmission including my improved hydraulic clutch;

Fig. 2 is a view in section, with certain of the parts removed for simplicity, along the line 2—2 of Fig. 1; and Fig. 3 is a view in perspective of the separated valve elements, including a counterweight employed in my apparatus.

Fluids utilized in previous hydraulic clutches include lubricating oils and similar liquids. Such oils are satisfactory for use in connection with the present arrangement, since additional provision for lubrication is thus eliminated. Ordinary gasoline engine crank-case or steam cylinder oil has been found satisfactory in practice.

The clutch, as illustrated in the drawing, is shown associated with a portion of an internal combustion engine having an engine drive shaft 10, carrying a fly wheel 12 and supporting one end of a driven shaft 14, rotatably mounted in a bearing 16 inserted within a depression formed in the drive shaft. The other end of the shaft 14 may be associated with suitable selective speed reduction gears of a form ordinarily found in automotive vehicles and having a final driven shaft 18.

A clutch housing 20 and a thrust plate 22 are securely attached to the engine fly wheel 12 by means of stud bolts 24, having their inner ends threaded into the fly wheel. The thrust plate 22 may be finished with a polished working surface to eliminate undue friction and may be composed of high quality, wear-resisting steel. The housing 20 is preferably formed as a casting having integral parallel spaced cylinders 28 with inwardly-directed, equally-spaced throttling outlet-ports 30. Pistons 32 slidable within the cylinders are grooved for seating leakage-resisting rings or the like, and bear against a cam face-plate 34 rotatably mounted on a cam 36 which is splined to the shaft 14. This cam may be arranged with opposing faces disposed in angular relation to cause the pistons to be reciprocated upon rotation of the cam. The face bearing against the thrust plate 22 is preferably lined with bearing metal to reduce wear. A retaining ring 38 fitting within a groove in the face plate 34 is secured to the cam 36 by screws 40, this plate being rotatable relative to the cam. The pistons 32 are resiliently forced against the face-plate by springs 46 enclosed within each cylinder and the face-plate is prevented from rotation with respect to the housing by the key 42 attached thereto and arranged in working engagement with a radial notch in the periphery of the face-plate. Each piston 32 is formed with a circumferential depression about its central portion and openings 50 extend through the walls of the piston within the depression to provide a direct path for oil through the outlet ports of each cylinder.

Inlet valve openings 52 enter into the cylinder at the end opposite to that in which the piston fits. The inner edge of these openings is formed with a valve seat to cooperate with an inlet valve 54 held against the seat by valve spring 56, supported by a shoulder bolt 58 attached to a central enlargement of a spider, intersecting the valve opening 52.

An end cover plate 60, fitted with a leak-proof packing 62 and attached by means of machine bolts 64 threaded into the housing, encloses the end opening and prevents loss of fluid. Removal of the cover plate permits access to the intake valves for inspection or other purposes. A stuffing box, having a gland 66 associated with a packing 68, which is depressed by the packing retainer 70, surrounds the shaft 14 and prevents leakage. A retainer spring 72 compresses the packing and insures a leak-proof seal. The inner end of the spring projects against an abutment plate 74, fitted within an enlargement in a central cylindrical chamber 76 about the counter shaft 14.

A centrifugal sleeve-shaped valve, including segmental valve element 78 and valve counterbalance element 80, are inserted into the chamber 76, in driving relation to the shaft 14 through the agency of loosely fitting keys 82, disposed in keyways 83 formed in the respective parts. The keyways in the valve parts preferably extend throughout their length in order to facilitate assembly. The valve element 78 has its outer surface partly cut away with the exception of arcuate surface 88, having the same radius as the inside of the chamber 76 and smoothly finished to effectively seal the outlet ports against which it is forced. This surface 88 may extend sufficiently in a circumferential direction, substantially to equal the distance between ports 30 so as to cover but one port at a time, or at least should cover only ports on one side of a line diametrical of the driven shaft, which marks the nodal points of piston movement. The valve should not close any ports on the side of the line at which the pistons are withdrawn from their cylinders. Closing of the ports as the pistons are forced into the cylinders produces an effective one-way or ratchet-drive in the direction from the engine to the driven shaft. The driven shaft may rotate faster than the drive shaft without appreciable drag with small differences of speed, but at greater speed differences the ports 30 again offer a resistance to fluid flow and allow the engine to produce a braking effect. At normal driving speed or thereabove, the valve 78 closes the cylinder port 30 of a piston which is tending to ride up the incline of the plate 34 and thereby provides a driving contact in the forward direction. Overrunning of the shaft 14, however, causes a relative movement of the pistons on the plate 34 in the opposite direction, which movement is permitted since the ports 30 from which fluid must pass upon such movement are not covered by the valve, and the piston whose cylinder port 30 is closed by the valve is at this time moving outwardly to draw fluid into its cylinder through the intake port 52. This relative movement is, however, limited by the capacity of these ports 30 and when this limit is being approached the restriction to the passage of fluid through these ports will cause the braking effect.

The valve parts, being subjected to rapid rotation, must be exactly balanced. To this end, the counter-balance 80 is fashioned in substantially the same form as the valve element 78 with the exception of a central groove 92. This groove allows free circulation of fluid through the ports adjacent the counter-balance. Nicks 94 may be cut into the edges of the valve element 78 to offset the loss of weight produced by the clearance groove in the counter-balance. By this formation the parts may be both statically and dynamically balanced. An important point in the construction of the valve is that the inner curved surface fits the shaft closely to prevent pivoting when the fluid pressure is not in line with the center of gravity.

Damage to the mechanical parts through deliberate abuse or extreme service requirements may be obviated by safety pressure release devices 96 provided in enlargements on the housing and with openings into the cylinders closed by spring-pressed valves. Outlet passages 98 for these valves discharge into the central enclosure of the housing 20.

A clutch constructed according to the present invention is especially adapted to replace the conventional friction clutches included as standard equipment on internal combusion engine-driven vehicles. The usual pedal control may be eliminated, substituting therefor automatic control by the centrifugally actuated valve. A gear case 100 may include a standard arrangement of change speed gears to increase the mechanical advantage of the drive between the engine and rear wheels of an automobile, by increasing the applied torque. Any desired gear ratio or a reverse drive may be effected by proper manipulation of the manual control 101. The shaft 14 projects within this casing and connects with the driving gear therein.

In operating the transmission to accelerate a vehicle, the same manipulation of controls is required as with the use of a friction disk clutch, except that the clutch pedal is eliminated. When a vehicle equipped with a clutch of the present construction is to be started from rest, the gears at 100 being in neutral, the engine is started and throttled to turn over at low speed. The shaft 14 does not rotate below the speed at which the centrifugal valve closes and any desired gear selection may be made by manipulating the manual control 101. Establishing a driving connection between the final driven shaft 18 and the counter shaft 14 stops the counter shaft, causing the pistons 32 to be reciprocated in their cylinders and fluid to circulate through the ports 30 as the housing 20, plate 34, etc., rotate relatively to the cam 36. The engine fly wheel 12 is then speeded up to increase the fluid circulation until the throttling action of ports 30 is effective in resisting the fluid flow, to produce a torque on the counter shaft, causing it to rotate. This driving force may be well explained by considering that the pistons can move backwardly only so fast as permitted by the fluid escaping outwardly through the ports 30. Backward movement of the pistons is therefore resisted in proportion to the engine speed whereby the torque acting to drive the cam 36 and shaft 14 increases proportionately with the increase of engine speed. The advantage of utilizing the engine torque at an increased engine speed is evident, since it is well understood that most internal combustion engines develop their greatest torque at increased speeds. Usually, the rotating force of an engine is greatly decreased at the slow speeds within which friction clutches must be operated.

As the shaft 14 begins to turn faster the valve 78 is forced outwardly by centrifugal force, restricting the fluid flowing through ports 30 to a greater degree, maintaining or increasing the coupling effect between the engine drive shaft 10 and the counter shaft 14 until a complete closing of the ports is produced and a substantially direct connection effected. In a construction such as illustrated wherein the valve 78 can close but one port 30 at a time, the drive at high speed, when such one port is entirely closed, will be through a single piston acting as a positive contact against the plate 34. It will, however, be understood that if desired the valve can be so constructed that more than one piston may be thus used, although such drive is, of course, limited to one-half the total number of pistons.

It may be noted that the device does not multiply the engine torque and so does not eliminate the need for the gear-set. However, it does make possible the application of full engine torque, even when the vehicle is stationary, and, therefore, starting in direct drive is practical except on steep hills. When it is necessary to employ an intermediate or lower speed gear in order to apply a greater torque to the final drive shaft 18, the proper selection may be made with the engine speed reduced. The clutch automatically picks up the load, accelerating the vehicle. When a reasonable speed is obtained in this lower gear, the engine may again be throttled to a slower speed than the shaft 14. The next higher ratio of gears may readily be selected and the engine accelerated, picking up the load when the engine shaft attains an equal or greater speed than the shaft.

Ports 30 may be designed in any predetermined size but for purposes of illustration, openings are suitable which will apply a maximum torque to the shaft 14 at an engine drive shaft speed of approximately 1000 revolutions per minute over that of the shaft. This range of speed is sufficient to permit easy manipulation of the gear shifting control 101 and also will not allow the vehicle to which the drive is installed to coast freely above speeds of 15 to 20 miles per hour. The ratchet effect of the valve arrangement allows the engine to slow down at any speed, thus saving in gasoline, since less is sucked from the carburetor, while still maintaining a braking action which results, both from turning over the engine and from the frictional energy dissipated within the clutch. The vehicle may be slowed down to a lower speed without the undesirable effects produced by irregular engine rotation and the use of intermediate and lower speed gears is almost entirely eliminated.

The weight of the valve element 78 may be so chosen as substantially to close the ports 30 at one side of the shaft when that shaft rotates above a speed of 15 miles per hour of the vehicle. This is the speed at which most automotive vehicles are designed to run smoothly in high gear. The valve may be suitably adjusted or replaced by removing the cover plate 60. If the gears are accidentally shifted at speeds of the shaft greater than this, while driving torque is being applied thereto, any impact will be absorbed by leakage produced with excessive pressures acting on the safety-release valves 96.

The use of a single opening in the housing of a hydraulic clutch through which a moving shaft extends, reduces the possibility of fluid leakage. The short passages through the side walls of the cylinders through the throttling ports improve the action of the centrifugal valve in governing the piston reciprocation and the arrangement of the cover plate facilitates adjustment and assembly of parts within the housing.

The terms "driving shaft" and "driven shaft" as used herein may be interchanged, since the clutch may be driven from either side, the driven shaft employed as a driver and the driving shaft being driven. Although the operation would not be the same in each case, in some types of mechanical drive it is desirable to make the connection in one way and in others in the opposite manner.

Having thus described my invention, what I claim as new and desire to secure by Letters Patent is:

1. In a hydraulic clutch, one or more cylinders having outlet ports, a shaft for rotating said cylinders, a second shaft adapted to be driven by the first shaft, and a member rotated by said second shaft and movable by the centrifugal force thereof for closing said ports.

2. In a hydraulic clutch, a driving shaft, a plurality of cylinders rotated by said shaft, pistons fitted within said cylinders, a driven shaft having means thereon for reciprocating said pistons, a chamber formed integrally with the cylinders and having ports opening into said cylinders, a valve member in said chamber carried by said driven shaft but automatically movable radially with respect thereto for closing the ports into said cylinders under the action of centrifugal force.

3. In a hydraulic clutch, a driving shaft, a fluid-tight housing fixed thereto and provided with a single external opening only, a movable shaft passing into said housing, a stuffing box on said housing in surrounding relation to said movable shaft, a pump cylinder formed within said housing and arranged with inlet and outlet ports, said inlet port being located adjacent said stuffing box, a centrifugally-controlled valve automatically operated by the rotation of said movable shaft, cooperating with said outlet port for governing the flow of fluid, and a piston fitted within said cylinder having operating means driven by the movable shaft.

4. In a hydraulic clutch, a driving shaft having a fluid-tight enclosing housing driven thereby, a driven shaft extending into said housing through a stuffing box, a circular walled chamber about said driven shaft within the housing, having spaced ports, and an arcuate faced centrifugally operated element loosely connected to said driven shaft in cooperative relation to said ports.

5. In a hydraulic clutch, a driving shaft having a fluid-tight enclosing housing driven thereby, a driven shaft aligned with said driving shaft and extending into said housing through a pressure-resisting joint, a circular chamber about said driven shaft within the housing, having spaced ports, and a segmental centrifugally operated element having an arcuate face of circumferential extent substantially equal to the distance between ports, rotatably connected to said driven shaft within said chamber.

6. In a hydraulic clutch, a driving shaft having a fluid-tight enclosing housing driven thereby, a driven shaft aligned with said driving shaft and extending into said housing through a pressure-resisting joint, a circular chamber about said driven shaft within the housing, having spaced ports, a segmental centrifugally operated element having an arcuate face of circumferential extent substantially equal to the distance between ports, rotatably connected to said driven shaft within said chamber, and a counter-balance on the driven shaft, having its outer surface cut away adjacent said ports.

7. In a fluid-controlling device, a plurality of cylinders with slidable pistons therein, spaced about a common center and having centrally-directed connecting passages, a central shaft having means including a motion changing mechanism for moving all the pistons located on one side of a line diametrical of said shaft, inwardly within their respective cylinders and all the pistons on the other side of said line, outwardly from their respective cylinders, a central chamber about said shaft and a valve member driven in timed relation to said motion changing mechanism, to automatically close the passages on one side of said line, preventing movement of the pistons into the cylinders on that side.

8. In a fluid-controlling device, a plurality of cylinders with slidable pistons therein spaced about a common center and having centrally-directed connecting passages, a central shaft having a motion changing mechanism for moving the pistons located on one side of a line diametrical of said shaft, inwardly within their respective cylinders, resilient means for returning the pistons outwardly, a central chamber about said shaft and a valve member driven in timed relation to said motion changing mechanism to close the passages on one side of said line, preventing the movement of the pistons into the cylinders on that side and the rotation of the shaft with respect to the cylinders except in one direction.

9. In a hydraulic clutch, a plurality of cylinders with slidable pistons therein, a shaft having mechanical operating means for said pistons, a centrifugal valve in the form of a split sleeve arranged about the shaft and a connection permitting free radial movement of said valve to control the piston movement through the checking of fluid flow.

10. In a power transmission system, a main drive shaft, a driven shaft aligned with but rotatable independently thereof, and a centrifugally-controlled clutch between said shafts adapted automatically to produce a direct driving connection between the shafts at a predetermined speed of one of the shafts and to permit free rotation of said driven shaft in the same direction but at a greater speed of rotation than that of said drive shaft.

11. In a power transmission system, a main drive shaft, a clutch driven thereby having a centrifugal controlling member and a driven shaft, said controlling member being operable at a predetermined speed of said driven shaft to produce a substantially direct drive between said drive and driven shafts but permitting independent rotation of said driven shaft at a speed greater than that of the drive shaft.

12. In a hydraulic clutch, a housing for retaining a quantity of fluid, a shaft for supporting and driving said housing a second shaft entering within said housing and having fluid pump actuating elements connected thereto, a central chamber in said housing surrounding said second shaft, a centrifugal valve contained within the chamber and a cover plate for supporting a stuffing-box about the said second shaft and removable.

13. In a hydraulic clutch, a housing for retaining a quantity of fluid, a shaft for supporting and driving said housing, a second shaft entering within said housing and having fluid pump actuating elements connected thereto, a central chamber in said housing surrounding said second shaft and a centrifugal valve contained within the chamber.

14. In a clutch including driving and driven members, centrifugal means controlled by the speed of rotation of the driven member for directly coupling the driven member to the driving member but at the same time permitting independent rotation of the driven member at a greater speed than that of the driving member, and throttling elements for preventing independent rotation of said members beyond a a predetermined speed.

15. A hydraulic clutch comprising a driving member, a driven member, a plurality of cylinders and cooperating pistons carried by one member, means carried by the other member and cooperating with the pistons to move them in their cylinders upon relative rotary movement of the members, means providing inlet and outlet ports to each of the cylinders, and valve means centrifugally operated from one of said members for controlling said outlet ports.

16. A hydraulic clutch comprising a driving member, a driven member, a plurality of cylinders and cooperating pistons carried by one member, means carried by the other member and cooperating with the pistons to move them in their cylinders upon relative rotary movement of the members, means providing inlet and outlet ports to each of the cylinders, and valve means centrifugally operated from the driven member for automatically closing certain only of the outlet ports and causing a positive driving connection between the corresponding piston or pistons thereof and the first-named means when the driven member reaches a predetermined speed.

17. A hydraulic clutch comprising a driving member, a driven member, a plurality of cylinders and cooperating pistons carried by one member, means carried by the other member and cooperating with the pistons to move them in their cylinders upon relative rotary movement of the members, means providing inlet passages to the cylinders, means providing normally open but restricted outlet ports therefrom, and valve means centrifugally operated from the driven member and acting upon certain only of said ports at one time to close the same in proportion to the speed of the driven member and thereby increase the driving torque in one direction between the members through the coaction of the first-named means and the pistons corresponding to the ports affected, limited relative rotation between the members in the opposite direction being permitted by the escape of fluid through the ports not affected by the valve means.

18. A valve controlling mechanism comprising a member having ports therethrough, a segmental valve rotatable adjacent to said ports and movable radially by centrifugal action to close said ports, and means for rotating the valve.

FRANK PULSIFER.